United States Patent
Asher

(10) Patent No.: US 8,751,610 B2
(45) Date of Patent: *Jun. 10, 2014

(54) METHOD AND SYSTEM FOR CACHING REAL-TIME DATA

(71) Applicant: AT & T Intellectual Property II, L.P., Atlanta, GA (US)

(72) Inventor: Michael L. Asher, Green Cove Springs, FL (US)

(73) Assignee: AT & T Intellectual Property II, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/622,875

(22) Filed: Sep. 19, 2012

(65) Prior Publication Data

US 2013/0018992 A1 Jan. 17, 2013

Related U.S. Application Data

(63) Continuation of application No. 11/733,541, filed on Apr. 10, 2007, now Pat. No. 8,296,394.

(51) Int. Cl.
*G06F 15/16* (2006.01)
*G06F 17/30* (2006.01)

(52) U.S. Cl.
CPC .... *G06F 17/30592* (2013.01); *G06F 17/30551* (2013.01)
USPC .......................................................... 709/219

(58) Field of Classification Search
CPC .................... G06F 17/30592; G06F 17/30551
USPC .......................................................... 709/219
See application file for complete search history.

(56) References Cited

U.S. PATENT DOCUMENTS

2005/0071379 A1* 3/2005 Kekre et al. .................. 707/200
2006/0241860 A1* 10/2006 Kimchi et al. ............... 701/208

* cited by examiner

*Primary Examiner* — Ashok Patel
*Assistant Examiner* — Lawrence Cosby
(74) *Attorney, Agent, or Firm* — Fay Kaplun & Marcin, LLP

(57) ABSTRACT

A system and method for storing data representing a multi-dimensional entity using corresponding dimensions for the data, storing a further dimension for the data, the further dimension being a modification timestamp indicating a time when the data was modified, receiving a request for the data representing the multi-dimensional entity, the request including a request timestamp indicating a further time when a previous request for the data representing the multi-dimensional entity was received and transmitting the data only when the modification timestamp is later than the request timestamp.

18 Claims, 2 Drawing Sheets

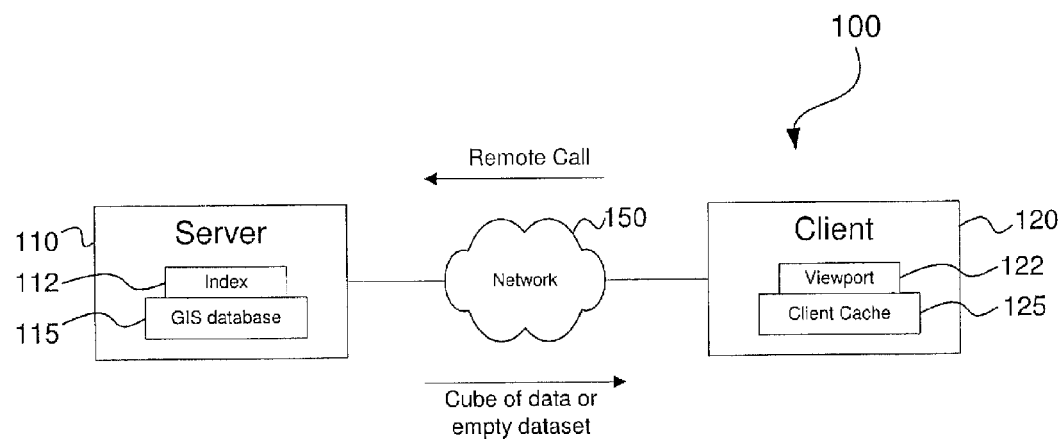
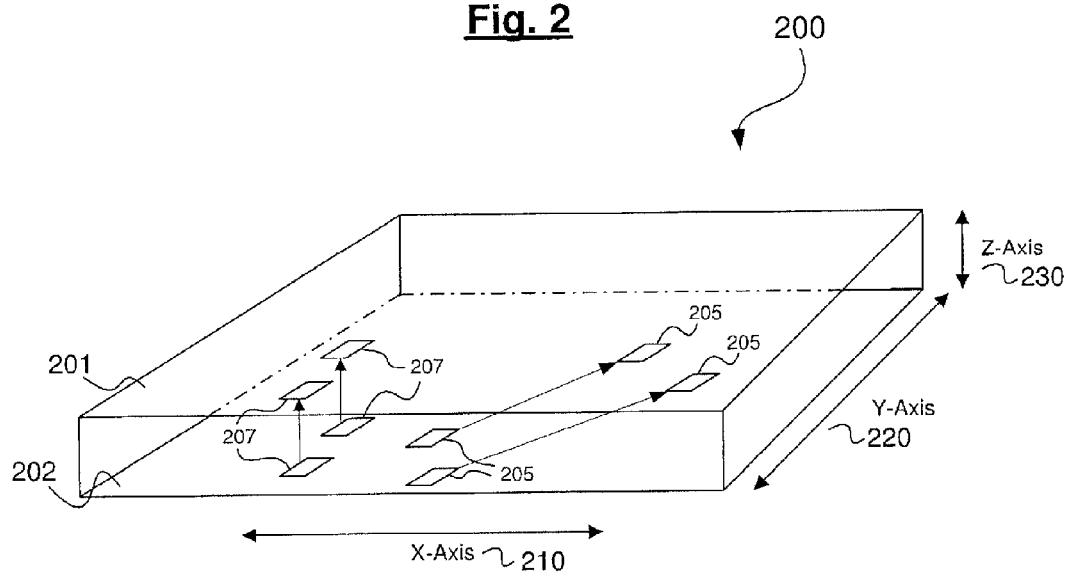

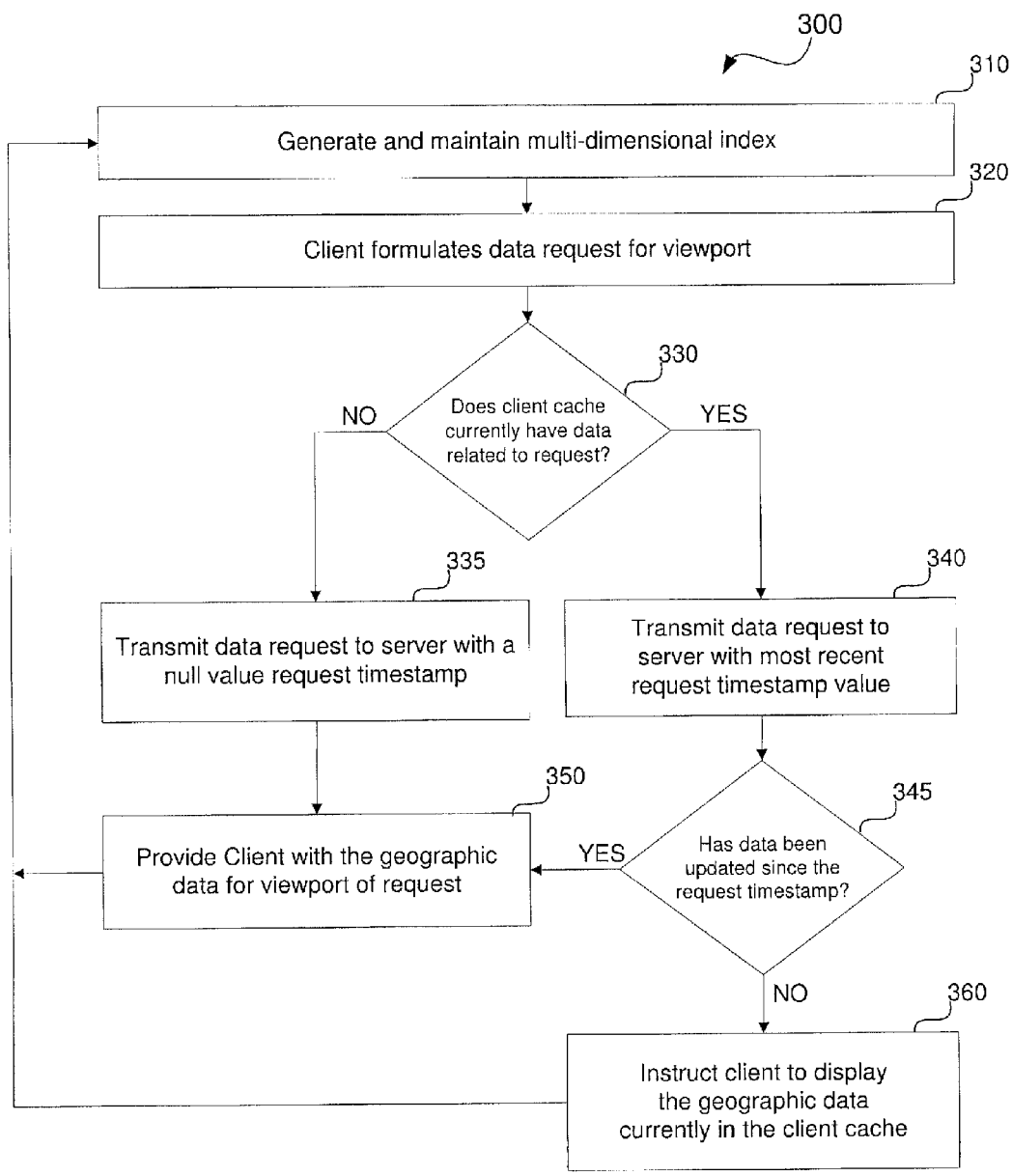

METHOD AND SYSTEM FOR CACHING REAL-TIME DATA

This application is a continuation of U.S. patent application Ser. No. 11/733,541 filed on Apr. 10, 2007, entitled "Method And System For Caching Real-Time Data." The entire disclosure of the prior application is considered as being part of the disclosure of the accompanying application and is hereby expressly incorporated by reference herein.

BACKGROUND

A geographical information system ("GIS") is a system for collecting, storing, analyzing, and managing data and attributes related to spatial and geographic data, or location information. GIS systems may manage large databases of location information, wherein the databases are maintained through continuously adding new location information and updating existing location information. Specifically, a computer system utilizing a GIS is capable of integrating, storing, editing, analyzing, sharing and displaying geographically referenced information.

Caching of data transmitted between a client of a GIS and a server of the GIS is a common technique to improve the performance of the GIS. However, for caching to function properly, a server within a GIS must be aware of the real-time location data that is cached on a client and must query immense amounts of database information to determine if the location information is accurate. Due to the problems associated with real-time caching, current GIS schemes either abandon caching altogether, or use a simplified scheme that results in a client requesting a great amount of unnecessary information.

SUMMARY OF THE INVENTION

A method for storing data representing a multidimensional entity using corresponding dimensions for the data, storing a further dimension for the data, the further dimension being a modification timestamp indicating a time when the data was modified, receiving a request for the data representing the multi-dimensional entity, the request including a request timestamp indicating a further time when a previous request for the data representing the multi-dimensional entity was received and transmitting the data only when the modification timestamp is later than the request timestamp.

A system having a memory storing data representing a multidimensional entity using corresponding dimensions for the data and storing a further dimension for the data, the further dimension being a modification timestamp indicating a time when the data was modified and a processor receiving a request for the data representing the multi-dimensional entity, the request including a request timestamp indicating a further time when a previous request for the data representing the multi-dimensional entity was received and transmitting the data only when the modification timestamp is later than the request timestamp.

A method for sending a current request for multidimensional data, the request including a request timestamp, wherein the request timestamp includes one of a null value request timestamp when the current request is an initial request for the multidimensional data and a time value of a most recent request when the current request is a subsequent request for the multidimensional data, receiving a response to the current request, wherein the response is a function of the request timestamp, storing the multidimensional data in a cache, applying a current timestamp to the multidimensional data, the current timestamp having a time value corresponding to the current request and displaying the multidimensional data to a user.

BRIEF DESCRIPTION OF THE DRAWINGS

FIG. 1 shows an exemplary system for real-time caching of geographic data according to the present invention.

FIG. 2 shows an illustration of exemplary three-dimensional region, including latitude and longitude values and a request timestamp value, for efficiently caching geographic data according to the present invention.

FIG. 3 shows an exemplary method for real-time caching of geographic data according to the present invention.

DETAILED DESCRIPTION

The present invention may be further understood with reference to the following description of exemplary embodiments and the related appended drawings, wherein like elements are provided with the same reference numerals. The present invention is related to systems and methods for efficiently caching geographic entities of an area within a client memory of an exemplary GIS application. Specifically, the present invention is related to systems and methods for creating a real-time multidimensional index of geographical entities, wherein the dimensions include longitude and latitude values, in addition to timestamp values. While the embodiments of the present invention are described herein as systems and methods using an exemplary GIS application, the present invention may be use in conjunction with any type of cartographic software system and/or mapping application.

In addition, the present invention may also be used with any system where large amounts of data are transferred and caching of this data would lead to more efficient operation. Those skilled in the art will understand that while the exemplary embodiments described are with reference to geographic data, the present invention is not limited to geographic data. That is, the exemplary methods and systems described herein may be used to cache other types of data.

Caching may be described as the process of storing data in a local memory or "cache" for repeated use in order to speed up access to resources while running an application. Within a traditional GIS application, caching of real-time geographic data on the client-side is complicated by both the two-dimensional format of the data and the operations performed on the data. For example, a user of a traditional GIS application may "pan" across a map view (e.g., adjusting the latitude and longitude coordinates of the map view while maintaining the map scale) to reveal additional regions to be concatenated with any previously cached data. A user may also "zoom" in/out of a map view (e.g., adjusting the map scale while focusing on specific latitude and longitude coordinates) to cause "uncached" data within the same region to be revealed. However, when caching real-time data (i.e., data that is not expected to remain constant throughout a duration of a client session), the age of each geographic data item must be considered. Specifically, some or all of the items within a cached map view of a region may be out-of-date shortly after reception. In other words, the items that were cached may no longer exist or may have moved to a different location.

The majority of past implementations of time-varying geographic data do not attempt caching at all. Furthermore, those implementations that do cache data do not refresh the cache as data changes, thereby resulting in out-of-date views. However, the caching functions of an exemplary embodiment of the present invention allow a client of an exemplary GIS application to succinctly and accurately notify a server of the data that is currently cached at the client and the new data that is needed by the client. Furthermore, the server of the exemplary GIS application may efficiently query a database containing vast amounts of data in order to provide the client with any new data that may be needed. Therefore, according to an exemplary embodiment of the present invention, data may be efficiently cached, resulting in large reductions in both server load and required bandwidth to provide the data to the client. Accordingly, this also results in a corresponding increase in client-side application response time. Thus, a client-server architecture employing an exemplary system and/or method of the present invention is capable of improving the performance of a GIS application through caching real-time geographic data. It is important to know that while an exemplary architecture may be described as a client-server architecture, the present invention may be employed on any multi-tiered architecture.

FIG. 1 shows an exemplary system 100 for real-time caching of geographic data according to the present invention. The system 100 may include a client 120 in communication with a server 110 via a link across a network 150. The server 110 may include a GIS database 115 and a multidimensional index 112. The GIS database 115 may be a vast storage component, containing billions of geographic items as well as terabytes of coordinate data. Furthermore, the GIS database 115 may include at least three coordinate values for each geographical entity of the GIS application. These values may include a latitude value (e.g., X-coordinate), a longitude value (e.g., Y-coordinate), and a modification timestamp value (e.g., the last time the data (X-coordinate or Y-coordinate) for the geographical entity was updated).

The server 110 may construct the multidimensional index 112 using an appropriate data structure and/or algorithm, for example, an R-tree, a local split decision ("LSD") tree, a pyramid tree, etc. In one embodiment of the present invention, the server 110 may classify the GIS database 115 using a layering concept. According to this embodiment, geographic entities, or items, may be classed into view layers by physical characteristics or other criteria. The multidimensional index 112 may include separate entries for each layer, wherein the layers may be extended as another portion of the concatenated index key. Alternatively, each layer may be considered an independent index of the geographic entities included therein. Once the multidimensional index 112 has been constructed, the server 110 may make the geographic data of the GIS database 115 available to any requesting clients. Accordingly, the client 120 may transmit a remote call to the server 110 over the network 150 in order to initiate a data request. In response to the remote call, the server 110 may transmit a "cube" of geographic data or an empty data set. The cube of data may include geographic data according to the three values of the data request (e.g., X-Y coordinates, and request timestamp). The cube of data may be transmitted to the client 120 when it is determined that the regional information in the client cache 125 for the data request is either non-existent or out-of-date. Alternatively, the empty data set may be transmitted to the client 120 when it is determined that the regional information in the client cache 125 for the data request is up-to-date.

The client 120 may include a client cache 125 and a display, or viewport 122. The client cache 125 may be a local memory available for repeated access by the client 120 in order to speed up access to information while running applications. As will be described in further detail below, the client cache 125 may store the requested geographic data from the server 110 and apply a request timestamp to the data request. The applied request timestamp may be stored within the client cache 125 for future reference. The viewport 122 may serve as a display component for viewing geographic data according to a specific data request. The viewport 122 may include latitude and longitude coordinates that translate directly to a specific region within the GIS database 115 of the server 110. Thus, the viewport 122 may be used to display the requested geographic data, wherein the source of the geographic data may be either the client cache 125 or the GIS database 115 of the server 110. The client cache 125 may supply the geographic data when the request timestamp of the requested region indicates that the data is up-to-date. Alternatively, the GIS database 115 may supply the geographic data when the request timestamp indicates that the data is out-of-date. The determination of the source of the geographic data will be described in further detail below in method 300 and FIG. 3.

FIG. 2 shows an illustration of exemplary three-dimensional cube of data 200 for efficiently caching geographic data according to the present invention. The cube 200 may include a top layer 201 and bottom layer 202, as well as at least one latitude range 210 (on the X-axis), one longitude range 220 (on the Y-axis), and one request timestamp value 230 (on the Z-axis). Furthermore, the cube 200 may include specific geographic entities 205 and 207. It is important to note that the term entity may be applied to a single item or to a group of associated items. The exemplary geographic entities 205 and 207, as illustrated in FIG. 2, represent a group of associated items. However, exemplary systems and methods of the present invention may be applied to an entity having a single item. The latitude range 210 and the longitude range 220 correspond to the requested displayable range to be displayed on the viewport 122. Those skilled in the art will understand that there may be many more geographic entities in the requested ranges, but entities 205 and 207 are shown for illustration purposes. As described above, the cube 200 may be stored within the GIS database 115 as well as within the client cache 125.

Within the cube 200, geographic entities 205 and 207 may be represented according to the location of the entity within the GIS database 115, as well as according to the time the entities 205 and 207 were at the location. The cube 200 may be used to track the changes in the geographic data during the passage of time. For example, as illustrated in FIG. 2, the specific requested region (e.g., latitude range 210 and longitude range 220) of the cube 200 may remain constant while the time value changes. The bottom layer 202 of the cube 200 may represent geographic data at a time value of zero (e.g., when a first request for data was received), and the top layer 201 may represent geographic data at a later time (e.g., a time value of five minutes when a subsequent request was received). Thus, the bottom layer 202 that is returned in response to the first request has a thickness of zero (0) corresponding to a time value (z-axis) of zero minutes. In contrast, the top layer 201 that is returned in response to the subsequent request has a thickness of five (5) corresponding to a times value (z-axis) of five minutes.

When the client 120 receives the first layer 202, the client cache 125 will assign a request timestamp to the layer 202 corresponding to the time zero. When the second request for the data is sent by the client 120, this second request will include the request timestamp for the currently cached data. The server 110 may use this request timestamp to compare to the index 112 to determine if the requested data has changed since the data has been cached. In this example, the data for entity 207 has not changed and therefore no addition data needs to be sent for this entity. In contrast, the geographic entity 205 relocated during the five-minute duration from the bottom layer 202 to the top layer 201. Specifically, during the time of zero at layer 202 to the time of five minutes at layer 201, the geographic entity 205 of the exemplary cube 200 has moved laterally, across the X-axis 210. The server 110 may send the set of data only for the entity 205 in response to the second request without the need to send the data corresponding to the entity 207. Thus, the cached data will be updated with respect to the entity 205 and the entity 207. However, the request timestamp will be updated to the time of the second request (e.g., the time corresponding to the time zero plus five minutes). For every subsequent reading of geographic data within the latitude value 210 and the longitude value 220, a new layer of geographic data may be added to the cube 200 along the Z-axis of the request timestamp value 230.

According to one embodiment of the present invention, the GIS database 115 may include numerous cubes of data for each region within the GIS application. Within each of these cubes, the server 110 may periodically update the geographic data, thereby increasing the modification timestamp value of each cube to the current time of the update. Alternatively, or in addition, the server 110 may be capable of detecting any changes made to the geographic data. Upon detecting a change to the data, the server 110 may update the geographic data, thereby increasing the modification timestamp value of the cube to the current time of the update.

As should be apparent from the above description, there are two timestamps of interest, the modification timestamp and the request timestamp. The modification timestamp is stored with the data on the GIS database 115 and is used to index this data into the multidimensional index 112. The modification timestamp indicates the last time the GIS database 115 received an update for the data. The request timestamp is applied by the client cache 125 and indicates the time when the data in the client cache 125 was stored, or was confirmed as fresh. The request timestamp maybe send by the client 120 to the server 110 so the server may compare the request timestamp to the modification timestamp for the data to determine if the data that is cached at the client 120 is fresh.

FIG. 3 shows an exemplary method 300 for efficient caching of geographical data in an exemplary GIS according to the present invention. This method 300 also allows for the creation of a multidimensional index for managing geographic entities within the GIS. The exemplary method 300 will be described with reference to the exemplary system 100 of FIG. 1. While the exemplary embodiments of system 100 and method 300 apply the present invention to organizing geographical data, the present invention may be used to organize any large set of time-varying data which is indexed or otherwise referenced in a multidimensional manner, In step 310, the server 110 may generate and maintain a multidimensional index 112. The manner in which the server 110 generates the multidimensional index 112 may vary. The server 110 may use any one of a number of traditional algorithms and/or data structure supports such as, for example, R-trees, LSD trees, pyramid trees, etc. The server 110 may maintain the multidimensional index 112 by continuously updating the index 112 based on any changes made to the geographic data. The server 110 may update geographic data in the GIS application anytime there is a detected change in the data. Each time the geographic data is updated by the server 110, the server 110 may record a new modification timestamp for the data that was updated. The update time (as indicated by the modification timestamp) for any given data will, therefore, reflect the exact time in which the server 110 detected the most recent change in the geographic data. Those skilled in the art will understand that the multidimensional index may be generated on any basis, for example, by layer, by entity, by groups of entities, by region, etc.

In step 320, the client 120 may formulate a data request to the server 110 for a selected viewport 122 on the GIS. As discussed above, the viewport 122 may be a two-dimensional representation of a specific geographical region within the GIS based on selected latitude and longitude coordinates. According to an exemplary embodiment of the present invention, the data request may include assigned latitude and longitude values as a first and second dimensions of the request, as well as a request timestamp value corresponding to the time of the data request as a third dimension. The assigned latitude value may relate to a horizontal range covered by the viewport 122 along coordinates in an X-axis, while the assigned longitude value may relate to a vertical range covered by the viewport 122, along coordinates in a Y-axis.

For example, an exemplary viewport 122 may be a 10×10 square geographical region of the GIS application having an area of 100 units and corner points located at coordinates (−5, 0), (−5, 10), (5, 10), and (5, 0). In this example, the latitude value of the viewport 122 may equate a latitudinal range along the X-axis of the GIS from a first X-component (−5) to a second X-component (5). Therefore, the latitude value may be a range from −5 to 5 on the X-axis. Accordingly, the longitude value of the viewport 122 may equate to a longitudinal range along the Y-axis of the GIS from a first Y-component (0) to a second Y-component (10). Therefore, the longitude value may be a range from 0 to 10 on the Y-axis. Thus, two dimensions of the data request may be described as coordinates of the exemplary 10×10 viewport 122 having a (−5 to 5) latitude value by a (0 to 10) longitude value.

Traditionally, a geographic entity is represented by its corresponding latitude and longitude values, thereby making the entity a two dimensional object. However, according to an exemplary embodiment of the present invention, the geographic entity is represented as, at least, a three dimensional object, wherein the third dimension may be a modification timestamp. In other words, the third dimension may correspond to the most recent update time of the data within the requested viewport 122, if available.

When the client 120 formulates a data request for a specific region, it is possible that geographical data corresponding to the viewport 122 already exists within the client cache 125. Accordingly, in step 330, a determination may be made as to whether or not geographical data already exists within the client cache 125 for the viewport 122 of the data request. The client 120 may perform the determination at step 330. If there is no geographical data within the client cache 125, the method 300 may advance to step 335.

The lack of geographical data within the client cache 125 may be due to the fact that the client 120 may be formulating an initial data request for a specific region. In other words, the data request may be the first request by the client 120 for that region. When there is no geographical data available on the client 120, the request timestamp may be set to a null value. In step 335, the null value may be transmitted by the client 120, along with the latitude and longitude range values of the viewport 122 coordinates, as a part of the data request to the server 110 for processing. Upon transmitting the data request to the server 120, the method may advance to step 350 in order to receive the requested data from the server 110. Step 350 will be described in greater detail below. While the above description indicates that the client 120 may determine if geographical data exists within the client cache, an alternative embodiment of the method 300 may allow the server 110 to be aware of the geographic data present on the client cache 125.

Accordingly to this alternative embodiment, the server 110 may perform the determination upon receiving the data request from the client 120.

If, at step 330, it is determined that geographical data does exist within the client cache 125, the method 300 may advance to step 340. As described above, the geographical data that exists within the client cache 125 may include a request timestamp as a third dimension of a data request. The request timestamp may indicate the last time in which the geographical data of a given region was updated, or refreshed, by the server 120. In other words, the request timestamp may indicate the relative "freshness" (or, alternatively, "staleness") of the geographic data. The request timestamp may be in a standardized digital format such as, for example, "Tue Jan 23 15:16:57 2007," wherein the time and date on the request timestamp indicates the time of the most recent update of the cached geographical data from the server 120. Alternatively, the request timestamp may be in the form of a running timer starting from an arbitrary time and date. According to this alternative embodiment, the request timestamp may indicate the time of the update in relation to the start of the timer. The timer may be in hour:minute:second format, such as, for example, "124:55:01," or may simply be in hour:minute format, "124:55." In step 340, the client 120 may formulate the data request to include the latitude and longitude values (e.g., two-dimensional coordinates) of the specific region along with the request timestamp of the most recent data update received from the server 110 (e.g., third dimension). Thus, the client 120 may transmit a three-dimensional data request. For example, the client 120 may transmit an X-value of (−5 to 5), a Y-value of (0 to 10), and a request timestamp of (124:15:01). Once the three-dimensional data request has been transmitted from the client 120 to the server 110, the method may advance to step 345.

In step 345, the server 110 may receive the data request and, based on the X-Y coordinates and the request timestamp, determine whether the geographical data of the client cache 125 is fresh. Specifically, the server 110 may compare the stored index 112 data to the request data and compare the request timestamp of the data request to the modification timestamp of the data for the requested region. The modification timestamp corresponds to the precise time that the server 110 last updated the geographical data of the region within the GIS application. The modification timestamp may be formatted according to the format of the timestamp in order to allow for simple comparisons between the two readings.

The comparison between the request timestamp from the client cache 125 for region and the modification timestamp from the server 110 for that region may indicate that the data contained in the client cache 125 is out-of-date. For example, the client 120 may transmit a data request for a region having a request timestamp of 124:15:01 (i.e., the last time the client 120 received data for that region). The server 110 may have geographic data with a modification timestamp of 135:42:05 (i.e., the last time the server 110 updated the data). Thus, the discrepancy in the times indicates that the data on the server 110 has been updated after the request timestamp from the client 120. In other words, the geographical data in the server 110 is more up-to-date than the geographical data in the client cache 125. However, if the request timestamp is more recent than the modification timestamp, the server 110 may presume that the geographical data on the client cache 125 is as current as the geographical data on the GIS application of the server 110. Thus, if the server 110 determines that the data for the requested region has been updated since the time of the request timestamp, the method may advance to step 350.

However, if the server 110 determines that the data for the requested region has not been updated since the time of the request timestamp, the method may advance to step 360.

In step 350, the server 110 may provide the client 120 with the geographical data of the requested region corresponding to the transmitted coordinates of the viewport 122. The data request may either have a null request timestamp (i.e., no geographical data within the client cache 125) or an out-of-date request timestamp (i.e., the geographical data within the client cache 125 has been modified). If the is no data cached for a specific region (e.g., the method arrived at step 350 from step 335), the client 120 may be requesting data for the first time for that region. Thus, the server 110 may provide all the requested geographical data in the requested region to the client 120. The client 120 may maintain the geographical data in the client cache 125 and assign a request timestamp to the data to be used for subsequent data requests. For example, a subsequent data for the same viewport 122 would have the exact same X-Y values. However, the request timestamp value will have changed to the time stored request timestamp. If data was stored in the client cache 125, but some (or all) of the data was out of date (e.g., the method arrived at step 350 from step 345), then the server 110 may send only that data that is out of date for the requested region. The new data will replace the out-of-date data in the client cache 125. However, the request timestamp will be updated for all of the data within the requested region. Accordingly, each region within the client cache 125 may have a request timestamp value (i.e., a time dimension) associated with the X-Y values (i.e., latitude and longitude dimensions). This assumes that the client cache 125 may store multiple regions. Upon providing the client 120 with the most current geographical data of the request region, the method 300 may return to step 310.

In step 360, the server 110 may instruct the client 120 to display the current geographical data within the client cache 125 of the region corresponding to the transmitted coordinates of the viewport 122. Since the server 110 has determined that none of the geographical data within the region has been added or updated after the request timestamp from the client 120, the server 110 does not need to transmit any updated geographical data to the client 120. Accordingly, the server 110 may instruct the client 120 that no new data is needed. Alternatively, the server 110 may simply return an empty record set to the client 120. Upon receiving the instructions, or the empty record set, from the server 110, the client 120 may reference the client cache 125 in order to display the requested geographical data of the viewport 122 and the client cache 125 will update to the request timestamp of the data in the client cache 125. As described in step 345, the server 110 may be able to ascertain that no new data needs to be sent to the client 120 through the comparison of the request timestamp of the client cache 125 and the modification timestamps of the data in the GIS database 115. Thus, the server 110 may only transmit the updated geographical data as needed by the client 120. This allows the server 110 to avoid wasting bandwidth, as well as avoid performing functions such as filtering, table scanning, query joining, etc. Upon instructing the client 120 display the current geographical data within the client cache 125, the method 300 may return to step 310.

A panning operation may be described as a viewport 122 translating laterally, along the X-axis, and/or longitudinally, along the Y-axis. The panning movement may expose new regions of the GIS application, as well as new geographical data within these new regions. Accordingly, the client 120 may need to request additional information from the server 110. Furthermore, the server 110 may need to confirm that the data within newly exposed regions within the client cache 125 is up-to-date.

During an exemplary panning operation, the first step for a query may be to generate a single cube of data, ignoring any potential data that may be stored in the client cache 125. From that cube, any cached geographic entities may be subtracted. The resultant cube may now be a more complex shape (e.g., non-convex). The resulting cube may then be broken down into cuboids (e.g., rectangular prisms), wherein each cuboid may represent a single query term. If the resultant query is too complex, the cuboids may be geometrically joined together. Accordingly, the resultant cube of data, when returned to the client 120 by the server 110, may then be coalesced with any data that is in the client cache 125 in order to yield a single, simplified cube representing the original query.

A zooming operation may be described as a change in the scaling factor between an overall world space and the viewport 122. An increase in the scaling results in a magnified view of a smaller area and may be referred to as "zooming in." Likewise, a decrease in the scaling results in a reduced view of a larger area and may be referred to as "zooming out." From a cache query perspective according to an embodiment of the present invention, zooming out may be handling the same manner in which the panning operation s performed. Specifically, as the viewport 122 zooms out, additional regions within the GIS application may be revealed. However, since zooming out will decrease the scale and show additional regions within the same viewport 122, the detail of the geographic entities may decrease or disappear while zooming out. On the other hand, zooming in on a cached area does not expose any additional regions. However, zooming in may expose lower-level geographic entities that were not originally visable through the viewport 122. If the embodiment of the present invention uses a layering system, wherein each layer maintains an independent dataset, the zooming operation will simply scale to the appropriate layer of the GIS database 115. Alternatively, if the geographic data is consolidated into a single dataset, then the cached entities and the computational geometry performed upon the entities may be translated up another order of dimensionality. For example, a query cube may become a hypercube, wherein the additional dimension may be a layer value (e.g., a degree of the zooming operation).

A series of panning and/or zooming operations performed in quick succession within a particular region may likely generate a null record set for each operation, as most of the geographic data is typically not updated during a small time interval. Accordingly, an embodiment of the present invention may quantize request timestamps in order to reduce query frequency in this situation. For example, request timestamps may be "rounded" to the nearest minute interval, so that five queries on the same region within the same minute may simply spawn a single query.

According to an alternative embodiment, performance may be optimized for applications that expect a large amount of user interaction. This application may request larger-than-needed viewports (e.g., having latitude and longitude values that exceed that of the request region) for data in order to reduce the number of remote calls to the GIS database 115 while performing panning operations. In addition, the applications may perform "look-ahead" queries for neighboring regions during any idle time processing.

According to a further alternative embodiment of the present invention, the GIS application data may be in three-dimensions, wherein the data includes an elevation value (i.e., a Z-coordinate). Similar to the above description for two-dimensional data, the three-dimensional data may be extended into a further dimension, namely a fourth-dimension, through the addition of a time value. Time-varying data of any sort and of any dimensionality may also be handled in such a manner.

Furthermore, in addition to multidimensional spatial indices, a similar approach may employ a hash table. According to this embodiment, the hash table may utilize a hash algorithm composed of a latitude/longitude tiling algorithm concatenated with the timestamp values.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
storing data representing a multidimensional entity using corresponding dimensions for the data, one of the dimensions being a modification timestamp indicating a time when the data was most recently modified;
receiving a request for the data representing the multidimensional entity, the request including a request timestamp indicating a further time when a most recent previous request for the data representing the multidimensional entity was made; and
transmitting the data only when the modification timestamp is more recent than the request timestamp.

2. The method according to claim 1, further including:
maintaining a database of data for a plurality of multidimensional entities, wherein each of the plurality of multidimensional entities includes corresponding dimensions, the corresponding dimensions including a corresponding modification timestamp; and
generating a multidimensional index of the database to reference at least one of the corresponding dimensions and the corresponding modification timestamp.

3. The method according to claim 2, further including:
periodically modifying the multidimensional index to account for changes to at least one of the corresponding dimensions of at least one multidimensional entity; and
updating the corresponding modification timestamp of the at least one multidimensional entity to indicate the time when the corresponding dimensions was modified.

4. The method according to claim 2, further including:
detecting a change in the corresponding dimensions of at least one multidimensional entity; and
updating the modification timestamp to indicate the time when the change to the corresponding dimensions was detected.

5. The method according to claim 1, wherein the method is performed by a server within a client-server network architecture.

6. The method according to claim 2, wherein the data is geographic data and the database is a geographic information system database.

7. The method according to claim 1, wherein the corresponding dimensions for the data includes a latitude value and a longitude value.

8. The method according to claim 1, wherein the corresponding dimensions for the data further includes an elevation value.

9. A system, comprising:
a memory to store data representing a multidimensional entity using corresponding dimensions for the data, a further dimension for the data, the further dimension being a modification timestamp indicating a time when the data was most recently modified and a set of instructions; and a processor executing the instructions to perform a method, comprising, receiving a request for the data representing the multi-dimensional entity, the request including a request timestamp indicating a further time when a most recent previous request for the data representing the multi-dimensional entity was most recently made, and transmitting the data only when the modification timestamp is more recent than the request timestamp.

10. The system according to claim 9, wherein the memory stores data for a plurality of multidimensional entities, wherein each of the plurality of multidimensional entities includes corresponding dimensions and a corresponding modification timestamp and a multidimensional index of the data to reference at least one of the corresponding dimensions and the corresponding modification timestamp.

11. The system according to claim 10, wherein the multi-dimensional index is periodically modified to account for changes to at least one of the corresponding dimensions of at least one multidimensional entity and the corresponding modification timestamp of the at least one multidimensional entity is updated to indicate the time when the corresponding dimensions was modified.

12. The system according to claim 10, wherein the method further comprises:

detecting a change in the corresponding dimensions of at least one multidimensional entity; and updating the modification timestamp to indicate the time when the change to the corresponding dimensions was detected.

13. The system according to claim 9, wherein the multidimensional entity is one of two dimensions and three dimensions.

14. The system according to claim 9, wherein the data is geographic data.

15. The system according to claim 9, wherein the corresponding dimensions for the data includes a latitude value and a longitude value.

16. The system according to claim 9, wherein the corresponding dimensions for the data further includes an elevation value.

17. A method, comprising:

sending a current request for multidimensional data, the request including a request timestamp, wherein the request timestamp includes one of a null value request timestamp when the current request is an initial request for the multidimensional data and a time value of a most recent previous request when the current request is a subsequent request for the multidimensional data;

receiving a response to the current request, wherein the response is a function of the request timestamp;

storing the multidimensional data in a cache;

applying a current timestamp to the multidimensional data, the current timestamp having a time value corresponding to the current request; and displaying the multidimensional data to a user.

18. The method according to claim 17, wherein the response includes one of the multidimensional data, a portion of the multidimensional data, and a null set.

* * * * *